July 31, 1928.
N. S. BLACK
1,679,325
CONVERTIBLE HAND TRUCK AND VEHICLE
Filed May 26, 1927  3 Sheets-Sheet 2
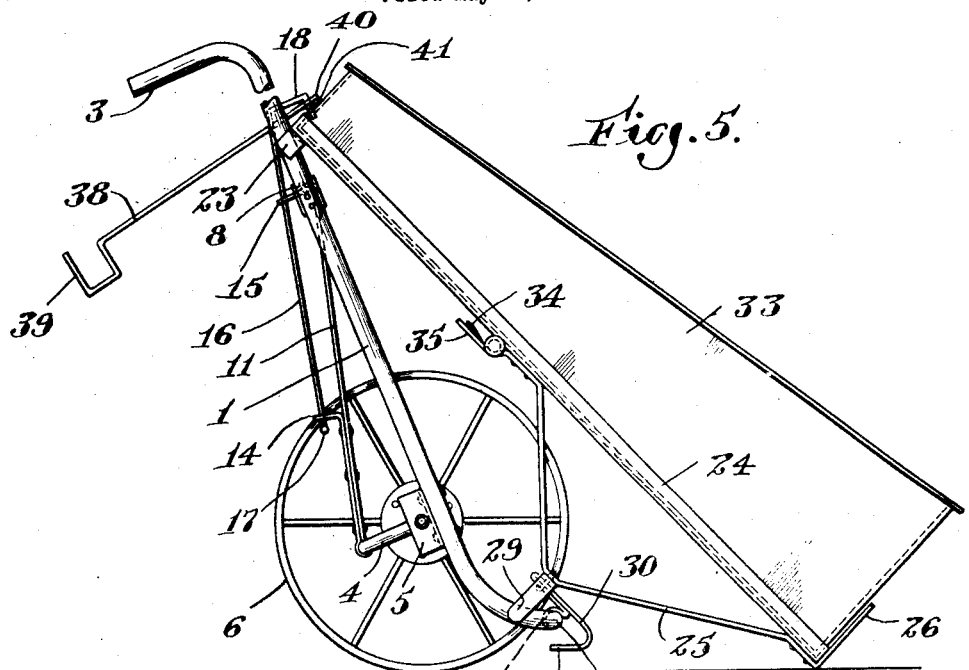
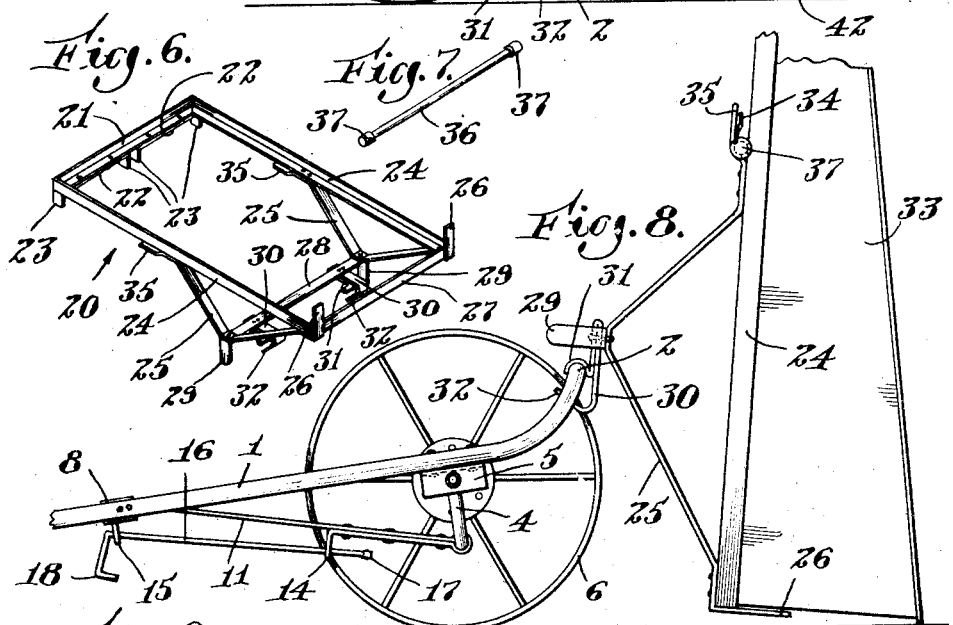

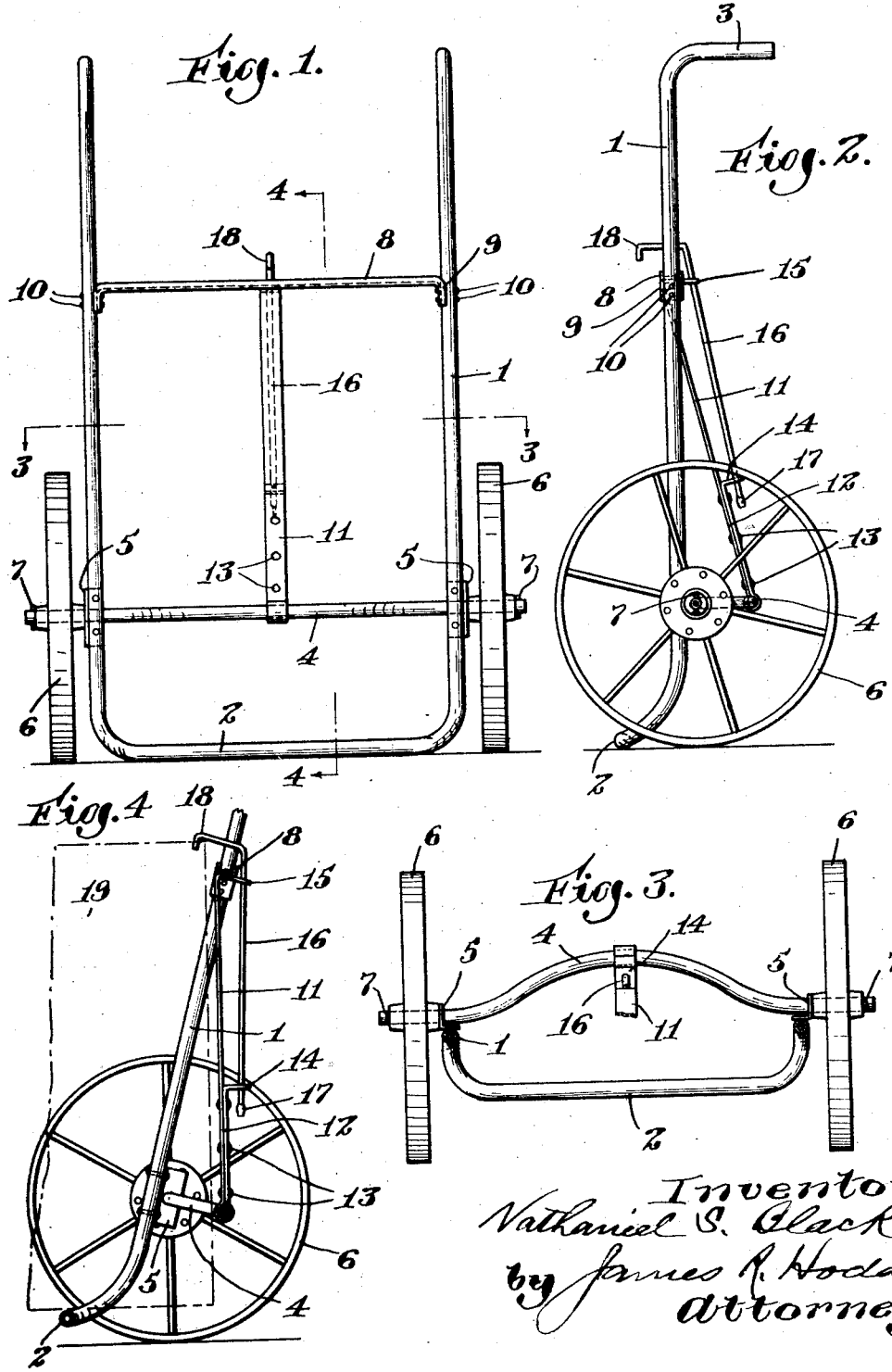

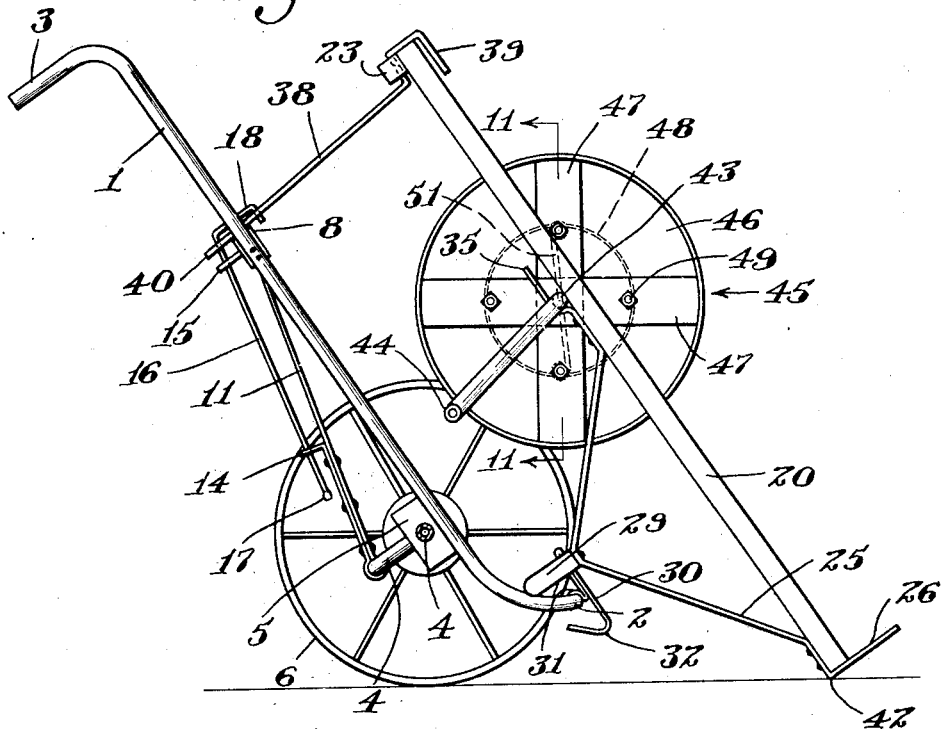

Patented July 31, 1928.

1,679,325

UNITED STATES PATENT OFFICE.

NATHANIEL S. BLACK, OF NEWTONVILLE, MASSACHUSETTS, ASSIGNOR TO THE CASEY FOSTER CO., OF BOSTON, MASSACHUSETTS, A CORPORATION OF MASSACHUSETTS.

CONVERTIBLE HAND TRUCK AND VEHICLE.

Application filed May 26, 1927. Serial No. 194,472.

My present invention relates to hand trucks, and more particularly to a hand truck convertible into different types of vehicles.

An important object of the present invention is the provision of a hand truck which will be simple in construction, economical to manufacture, and efficient in use.

A further feature of the present invention resides in the provision of a hand truck so constructed and arranged as to form a self-supporting vehicle, and having capacity for carrying thereon such articles as barrels or the like.

A further feature of the present invention resides in the fact that I provide a quickly attachable and detachable frame, which frame is capable of utilization in several different manners. It may be utilized as a package or bundle carrier in and of itself, and it is so constructed and arranged as to provide a platform or carriage for a box or barrow. When utilized in the latter capacity, I provide means whereby my convertible vehicle becomes self-dumping, and in this manner is very efficient and satisfactory.

Instead of utilizing a box or other carrier on the attachable frame, I may apply other instrumentalities to my device, such as a hose reel, particular reference being had to the type of hose reel illustrated herein, which is particularly adaptable to the structure of my present invention.

I believe that such a structure, consisting of a combination convertible hand truck and vehicle, as above briefly described, is novel, and I have therefore claimed the same broadly herein.

Referring to the drawings, illustrating a preferred embodiment of the present invention, Fig. 1 is a front elevation of the truck;

Fig. 2 is a side elevation thereof;

Fig. 3 is a cross sectional view on the line 3—3 of Fig. 1;

Fig. 4 is a vertical section on the line 4—4 of Fig. 1;

Fig. 5 is a side elevation of the truck with detachable frame and box combined;

Fig. 6 is a perspective of the detachable frame;

Fig. 7 is a perspective of the locking bar;

Fig. 8 is a side view of the vehicle in dumping position;

Fig. 9 is a fragmentary detail illustrating the spring locking clips on the box;

Fig. 10 is a side elevation of the truck, detachable frame, and a hose carrying reel;

Fig. 11 is a cross sectional view of the reel on the line 11—11 of Fig. 10; and

Fig. 12 is an end elevation of the hose carrying reel.

As shown in the drawings, Figs. 1 to 4 inclusive, my present invention comprises a truck, consisting of a substantially U-shaped frame 1, preferably formed of tubular metal for strength and rigidity. The bottom of the frame, as illustrated at 2, is bent or curved forwardly to provide a rest for the truck. At the top the arms of the U-frame are bent rearwardly, as clearly shown at 3, to form handles to manipulate the truck. An axle 4 extends through angle irons 5 secured to the arms of the U-frame 1, and at the ends of the axle 4 projecting through the angle irons 5, are applied wheels 6, 6, secured in position by cotter pins 7, 7. The angle irons 5 are positioned on the arms of the frame 1 at a height from the bottom to insure the bottom of the wheels 6 being on the same level with the bottom 2 of the U-frame 1 when the truck is in normal resting position. This gives a very good support for the truck, resting as it does on the two wheels 6 and the long bottom 2 of the frame 1. Spanning the arms of the frame 1, at a suitable distance above the axle 4, is a member 8, preferably formed of channel iron, so that the ends thereof may be bent as shown at 9, and will partially surround or enclose the arms of the frame 1, being secured thereto by rivets 10. A strap member 11 is bent around the axle 4, substantially midway thereof, and is bent back upon itself as shown at 12, and securely riveted or fastened together as at 13. This strap member has a lower projecting arm 14, with an aperture therethrough, and the strap member 11 also has an upper projecting arm 15 with an aperture therethrough, the arm 15 being secured through the crossbar 8.

A vertically adjustable holding member 16 is fitted through the apertures in the arms 14 and 15, having an enlarged portion 17 on its lower end, to limit the vertical movement thereof. The top of this member 16 is formed as a hook 18, to clamp over the edge of a barrel or other article illustrated in dotted lines at 19, the bottom of the barrel resting on the bottom 2 of the frame 1, and the back of the barrel abutting against or fitting in the curve of the axle 4.

In utilizing my present novel truck, the barrel or the like is tilted forward, and the bottom 2 of the frame 1 is slid thereunder. Thereupon the top of the barrel is drawn toward the truck, or vice versa, and the member 16 is raised, until the hook 18 clears the edge of the barrel, whereupon the hook 18 is caught or snapped over the edge of the barrel, and the operator can then manipulate the truck merely by grasping the handles 3, tilting the truck backwardly until it rides on its wheels 6, and can then move the barrel 19 to any desired location.

Having thus devised a simple and efficient truck, which I believe is novel, I have included, in the present application, broad claims thereto.

In Figs. 5 to 9 inclusive I have illustrated one feature of the convertibility of my novel truck, wherein the same can be used as a barrow, having the capacity of a substantially automatic dumping feature.

In the form of the structure illustrated in Figs. 5 to 9 inclusive, also, I may dispense with the box or barrow, and utilize a quickly attachable and detachable frame, as a parcel or package carrier. In this phase of the invention, the truck portion of the device is formed the same as in Fig. 1. An adjustable support or rest for the barrow when filling or loading the same is also provided. In this form I utilize the U-frame 1, bottom or base 2, handles 3, axle 4, angle irons 5, and wheels 6, together with the crossbar or channel iron member 8, together with the strap member 11, and arms 14 and 15. The holding member 16 having the enlarged or flattened bottom portion 17 and hook 18 is also utilized in the present device.

To the truck thus far described I apply a detachable frame 20, composed preferably of angle irons, to provide a side wall to the frame 20. To the rear wall 21 are riveted or otherwise secured a pair of straps 22, 22, having depending arms or webs 23, these members 22 being formed substantially U-shaped. The outer depending webs 23 are of a width to fit over the arms of the U-frame 1 of the truck, to prevent sidewise movement thereof, and the hook 18 engages the top of the wall 21 of the frame 20. Riveted to the sides 24, 24 of the frame 20 are a pair of substantially V-shape straps 25, each strap 25 having its end 26 bent or angled over the end of wall 27 of the frame 20, and projecting upwardly, to form supports or rests for parcels or packages to be carried thereon. Spanning the bottoms of the V-members 25, and securely affixed thereto, is a crossbar or cross-strap 28, having depending arms or webs 29 adapted to span the arms of the U-frame 1 adjacent to the bottom thereof. Affixed to this crossbar 28 are a pair of members 30, each formed with a hook portion 31, which hook portions are adapted to fit over the bottom 2 of the frame 1. The members 30 are also provided with supplementary hook or guard members 32, to more positively insure guiding and seating of the hooks 31 over the bottom 2 of the frame 1.

Thus this quickly attachable and detachable frame is readily applicable to my novel truck, converting the same into a baggage carrier, the frame 20 being capable of carrying heavy loads, such as trunks or the like.

A still further feature of the present invention is the fact that to the quickly attachable and detachable frame 20 and within the walls formed by the angle irons of which the same is constructed, I may apply a box or barrow 33, of wood or metal, and capable of carrying a desired load. To the bottom of the barrow 33 are secured a pair of strong hooks or locking members 34, adapted to aline, when positioned on the frame 20, with the slightly depending arms 35 of the V-members 25. When applied to the frame 20, and in order to lock or secure the barrow 33 thereto, a locking bar 36 is snapped into position over the arms 35 and into the strong hooks or catches 34. This locking bar 36 has enlarged ends 37, to insure against slippage sideways of the locking bar 36. To act as a support for the box or barrow 33 and the truck, when loading the box 33, I provide a rest or support 38, the flattened end 39 thereof being adapted to rest on the ground, and the end 40 being provided with a pair of perforations adapted to fit over the hook end 18 of the holding member 16, and thus provide a strong seat for the support 38. Also, on the upper end of the box 33 I secure a perforated plate 41, the perforation in said plate alining with a corresponding perforation in the upper end wall of the box 33, and through these perforations the hook 18 extends. Thus, the box is securely held in position, by the locking bar 36 intermediate the ends, at its lower end by the angle irons of the frame, and at its upper end by the locking hook 18.

When it is desired to dump or unload the box or barrow 33, the locking hook 18 is released from the apertures in the plate 41 and end of the box 33. Thereupon, the handles 3 are forced downwardly toward the ground or floor, raising the bottom 2 of the U-frame 1 upwardly, hence exerting pressure against the hooks 31, and raising the top of the box 33 until the box assumes the position illustrated in Fig. 8, which will effect a complete dumping or unloading of the contents of the box 33. The handles 3 can then be raised, bringing the box and frame again into contact with the U-frame 1, and permitting the locking hook 18 to be again applied.

It will be seen that the device as thus described will rest, on the wheels 6 and on the V-members 25 at the angles thereof, as illustrated at 42, thus providing a firm and positive support for the device.

I believe that this form of my present invention is also novel, and I have therefore claimed the same broadly herein.

Figs. 10 to 12 illustrate a still further embodiment of the present invention, wherein the same is utilized as a portable hose carrying reel. The truck construction is identical with the truck construction heretofore described in the previous embodiments of the invention, as is also the construction of the frame 20. I effect one alteration in the position of the frame 20, and instead of having the outer depending arms 23 of the U-members 22 engaging the arms of the U-frame 1, I so position the frame 20 that it is spaced apart from the U-frame 1, by means of the supporting member 38, the position of which supporting member is reversed, the hook end 39 engaging the top of the frame, between the two central depending webs or arms 23, to prevent side slipping of the frame. The apertured end 40 of the member 38 is fitted over the holding or locking hook member 18.

The device as thus far described rests on the wheels 6 and on the angled portions 42 of the V-members 25. A shaft 43 is carried by the ends 35 of the V-members 25, these ends 35 being formed as holding members, as clearly shown in Fig. 10. A handle 44 is provided for rotating the shaft 43, and on the shaft 43 is carried any suitable device, here shown as a novel hose reel 45, this hose reel comprises a pair of flanged plates 46, and on each plate 46 are a pair of straps 47. Mounted between the plates 46 is a reel or cylinder 48, and a plurality of bolts 49 at predetermined spaced intervals, these bolts penetrating both the plates 46 and the straps 47. A cotter pin 50 is inserted through a suitable aperture in the axle or shaft 43, between the straps 47 and the plate 46, at one end, and at the other end of the reel a wire or the like 51 is positioned between one strap 47 and the plate 46, this wire being wrapped around opposite bolts 49, and passing through an aperture in the shaft or axle 43, as shown at 52. This construction insures rotation of the reel 45 upon rotation of the handle 44 and axle or shaft 43.

Thus it will be seen that I have devised a novel hose reel, of simplified construction, and yet sturdy and rugged, and have coupled with this novel hose reel my novel form of truck and carrying frame, thus producing a new article of manufacture, consisting in a portable hose reel of the kind described.

I believe that such a hose reel and carrier is novel, and have therefore claimed the same broadly herein.

While I have necessarily described my present invention somewhat in detail, it will be appreciated that I am not limited thereto, but may vary the size, shape, and arrangement of parts, within reasonably wide limits, without departing from the spirit of the invention.

Also, further applications and utilities of my present novel form of truck will doubtless present themselves to those skilled in the arts, and I do not, therefore, limit myself to any one of the additional features over and above the truck itself disclosed herein.

My invention is further described and defined in the form of claims as follows:—

1. A device of the kind described, comprising a U-frame having its upper ends formed as handles, an axle, wheels on said axle, a frame detachably secured to said U-shaped frame at a plurality of points, said wheels and one end of said frame forming supports for the device.

2. A device of the kind described, comprising a U-frame having its upper ends formed as handles, an axle, wheels on said axle, a frame detachably secured to said U-shaped frame at a plurality of points, said wheels and one end of said frame forming supports for the device, and a separate supporting member detachably affixed to said device.

3. A device of the kind described, comprising a U-frame having its upper ends formed as handles, an axle, wheels on said axle, a carrying frame, V-shaped straps depending from the sides of said carrying frame, a crossbar between the bottoms of said V-straps, and means secured to said crossbar and engaging the bottom of said U-frame, said crossbar having depending arms adapted to span the lower portion of said U-frame, depending arms on the upper end of said carrying frame adapted to span the upper portion of said U-frame, and means carried by said U-frame to hold the upper end of the carrying frame, whereby said carrying frame is detachably secured to said U-frame at a plurality of points.

4. A device of the kind described, comprising a U-frame having its upper ends formed as handles, an axle, wheels on said axle, a carrying frame, V-shaped straps depending from the sides of said carrying frame, a crossbar between the bottoms of said V-straps, means secured to said crossbar and engaging the bottom of said U-frame, said crossbar having depending arms adapted to span the lower portion of said U-frame, depending arms on the upper end of said carrying frame adapted to span the upper portion of said U-frame, means carried by said U-frame to hold the upper end of the carrying frame, whereby said carrying frame is detachably secured to said U-frame at a plurality of points, a box carried by said carrying frame, means to secure said box to said carrying frame, said means comprising a pair of spring clips on the bottom of said box, a pair of clips on the bottom of said carrying frame, and a locking bar to engage all of said clips.

5. A vehicle of the kind described, comprising a U-frame, handles on the upper portion thereof, an axle, wheels on said axle, a carrying frame detachably secured to said U-frame at a plurality of points, a box carried by said frame, means to secure said box to said frame at a plurality of points, said means comprising a pair of spring clips on the bottom of said box, a pair of clips on the bottom of said frame, and a locking bar associated with all of said clips to secure said box to said frame.

6. A vehicle of the kind described, comprising a U-frame, handles on the upper portion thereof, an axle, wheels on said axle, a carrying frame detachably secured to said U-frame at a plurality of points, a box carried by said frame, means to secure said box to said frame at a plurality of points, said means comprising a pair of spring clips on the bottom of said box, a pair of clips on the bottom of said frame, and a locking bar associated with all of said clips to secure said box to said frame.

7. A vehicle of the kind described, comprising a U-frame, handles on the upper portion thereof, an axle, wheels on said axle, a carrying frame detachably secured to said U-frame at a plurality of points, a box carried by said carrying frame, means to secure said box to said carrying frame at a plurality of points, said means comprising a pair of spring clips on the bottom of said box, a pair of clips on the bottom of said frame, and a locking bar associated with all of said clips to secure said box to said frame, said carrying frame being pivotally mounted on the bottom of said U-frame.

In testimony whereof, I have signed my name to this specification.

NATHANIEL S. BLACK.